J. Strong,

Broom Handle.

Nº 107,559.   Patented Sep. 20. 1870.

Joel Strong
Inventor.
by his Attorneys
Knight Bros.

ATTEST.
Jas. H. Layman,
William F. Bauer

N. PETERS, PHOTO-LITHOGRAPHER, WASHINGTON, D.C.

United States Patent Office.

JOEL STRONG, OF COLLEGE HILL, OHIO.

Letters Patent No. 107,559, dated September 20, 1870.

IMPROVEMENT IN BROOM-HANDLES.

The Schedule referred to in these Letters Patent and making part of the same

I, JOEL STRONG, of College Hill, Hamilton county, Ohio, have invented a new and useful Broom-Handle, of which the following is a specification.

Nature and Object of the Invention.

This invention relates to a long detachable handle, which is to be applied to brooms in such an inclined manner as to permit of the entire sweeping-surface of the same being brought to bear upon the floor, while the operator maintains a perfectly erect and easy position, and at the same is enabled to perform more work with less fatigue than could be done with the old-fashioned straight handle.

In addition to the above advantages, my inclined handle prevents the garments of the operator coming in contact with the broom, and also causes the wear of the broom to be uniform on its sweeping-surface, and not to run down on one side.

General Description with Reference to the Drawing.

A represents an ordinary broom, having securely attached to it a handle, B, which, instead of being of the customary length, is quite short, say five or six inches.

Figure 1:
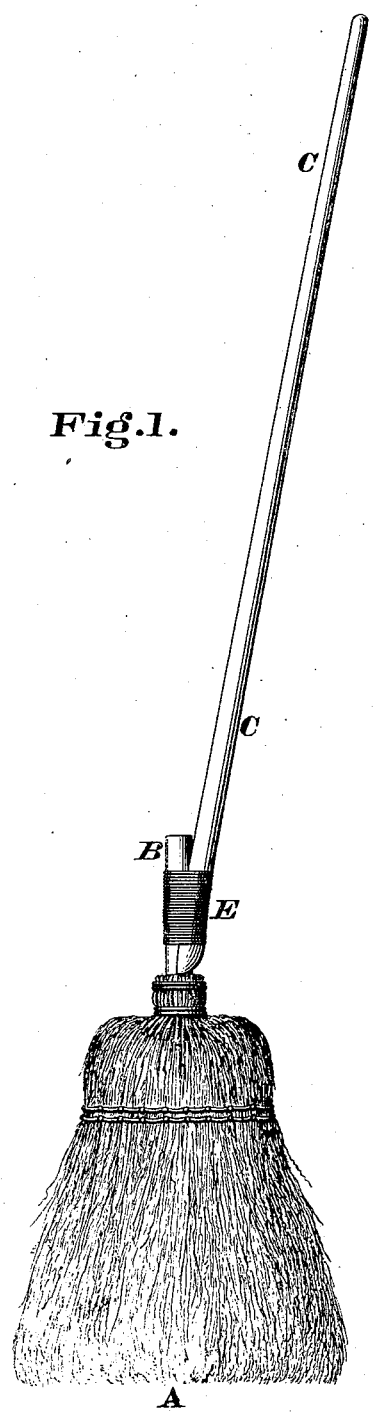
Figure 1 is a side elevation of a broom provided with my inclined handle.
Figure 2:
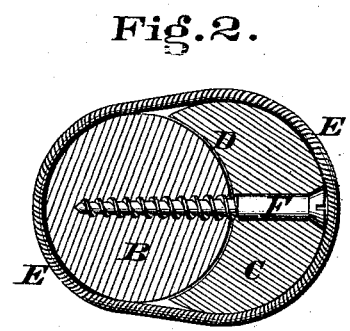
Figure 2 is a horizontal section, showing the mode of attachment.

Connected to this short stump is the handle proper, C, which is of any desired length, and which is united to said stump in the inclined position shown in fig. 1.

Figure 3:
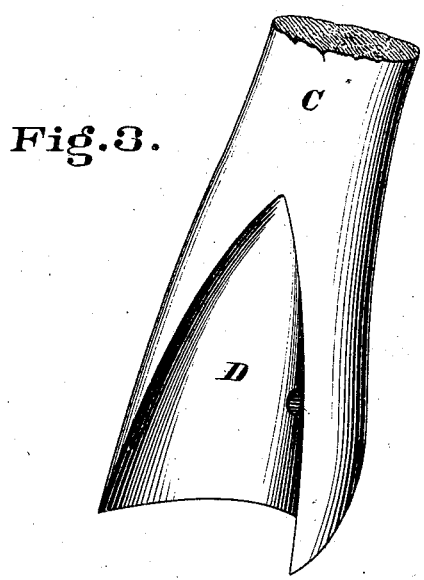
Figure 3 is a perspective view of the lower portion of my inclined handle; the two last illustrations being drawn on a somewhat enlarged scale.

In order to facilitate the uniting of the handle to the stump at the proper inclination, I provide the lower portion of said handle with a recess, D, having the shape represented in fig. 3.

The recess D enables the detachable handle to be fitted to and connected on any side of the stump in a few minutes.

The long detachable handle C is united to the stump B either by twine or wire wrapping, E, with or without a screw, F, or a bolt or wooden pin, or it may be attached by means of one or more screws, bolts, or clips, without wrapping.

Claim.

I claim herein as new and of my invention—

As a new article of manufacture, the detachable handle C D, for application to brooms in the inclined manner herein described, and for the purpose set forth.

In testimony of which invention I hereunto set my hand.

JOEL STRONG.

Witnesses:
WILLIAM BAUER,
JAMES H. LAYMAN.